United States Patent

Sugiyama

[11] Patent Number: 4,753,524
[45] Date of Patent: Jun. 28, 1988

[54] LENS FOR USE WITH AN OPTICAL DISK

[75] Inventor: Takahiro Sugiyama, Tokyo, Japan

[73] Assignee: Asahi Kogaku Kogyo Kabushiki Kaisha, Tokyo, Japan

[21] Appl. No.: 868,849

[22] Filed: May 30, 1986

[30] Foreign Application Priority Data

May 31, 1985 [JP] Japan .................. 60-118613

[51] Int. Cl.⁴ ............... G02B 9/06; G02B 9/12
[52] U.S. Cl. ................................. 350/480
[58] Field of Search ........... 350/480, 470, 475, 477

[56] References Cited

U.S. PATENT DOCUMENTS 4,572,623 2/1986 Tanaka et al. ................ 350/480
4,632,520 12/1986 Yamakawa .................... 350/470

*Primary Examiner*—John K. Corbin
*Assistant Examiner*—Rebecca D. Gass
*Attorney, Agent, or Firm*—Sughrue, Mion, Zinn, Macpeak & Seas

[57] ABSTRACT

A lens system for use with an optical disk comprises, in order from the side of a light source, a front group composed of a cemented lens made up of positive and negative lenses, and a rear group composed of a single positive lens or one positive and one negative lens. The lens system satisfying the following conditions:

$$\nu_{30} > 50, \nu_- < 35; \qquad (1)$$

and $$\Delta N_{30}/\Delta N_{31} \geq 0.5, \Delta N_{31} > 0 \qquad (2)$$

where $\nu_{30}$ is the Abbe number of a positvie lens, $\nu_{31}$ is the Abbe number of a negative lens, $\Delta N_{30}$ is the temperature coefficient of the refractive index of a positive lens, and $\Delta N_{31}$ is the temperature coefficient of the refractive index of a negative lens.

9 Claims, 8 Drawing Sheets

TEMPERATURE VS. FOCAL POINT DISPLACEMENT

TEMPERATURE VS. FOCAL POINT DISPLACEMENT

LENS FOR USE WITH AN OPTICAL DISK

BACKGROUND OF THE INVENTION

The present invention relates to a lens for use with an optical disk or high-density information recording medium.

Lenses employed in reading or writing high-density information on optical disks are required to have resolutions as high as about 1 μm in order to permit detection of densely packed signals. In addition, the light sources used with optical disks experience variations in wavelength, causing changes in the focal point and aberrations which are sometimes too great to be neglected depending on the precision required for the operation of the optical disk.

The environment in which such lenses are used is becoming increasingly hostile, particularly in terms of temperature changes. Therefore, depending on the degree of a certain temperature change and the precision required for the operation of the optical disk, the temperature change may cause significant variations in the focal point and aberrations.

While many lenses have been proposed in the past for use with optical disks, little consideration has been given to variations in wavelength (i.e., chromatic aberration) or to temperature changes.

OBJECT AND SUMMARY OF THE INVENTION

The primary object of the present invention is to provide a lens system for use with an optical disk that is capable of aberrational correction not only at a single wavelength but also at a plurality of wavelengths, thereby minimizing the variations in the focal point and aberrations that may result from the changes in the wavelength of the light source, and which is also capable of minimizing the variations in the focal point and aberrations that may result from temperature changes.

In order to attain the aforementioned object, the lens system of the present invention for use with an optical disk comprises, in order from the side of a light source, a front unit composed of a cemented lens made up of a positive and negative lens, and a rear unit composed of a single positive lens or one positive and one negative lens, said lens system satisfying the following conditions:

$$\nu_+ > 50, \nu_- < 35; \quad (1)$$

and $$\Delta N_+ / \Delta N_- < 0.5, \Delta N_- > 0 \quad (2)$$

where $\nu_+$ is the Abbe number of a positive lens, $\nu_-$ is the Abbe number of a negative lens, $\Delta N_+$ is the temperature coefficient of refractive index of a positive lens, and $\Delta N_-$ is the temperature coefficient of refractive index of a negative lens.

Figure 1:
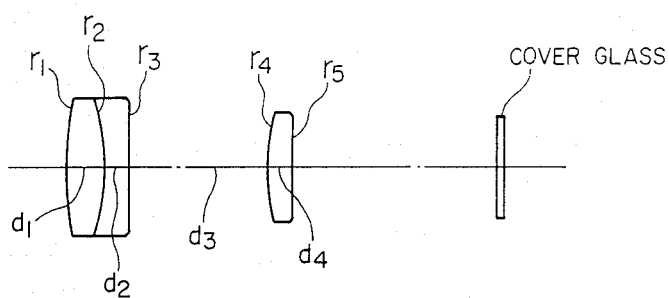
FIG. 1 is a simplified cross-sectional view of the lens system constructed in Example 1.
Figure 2:
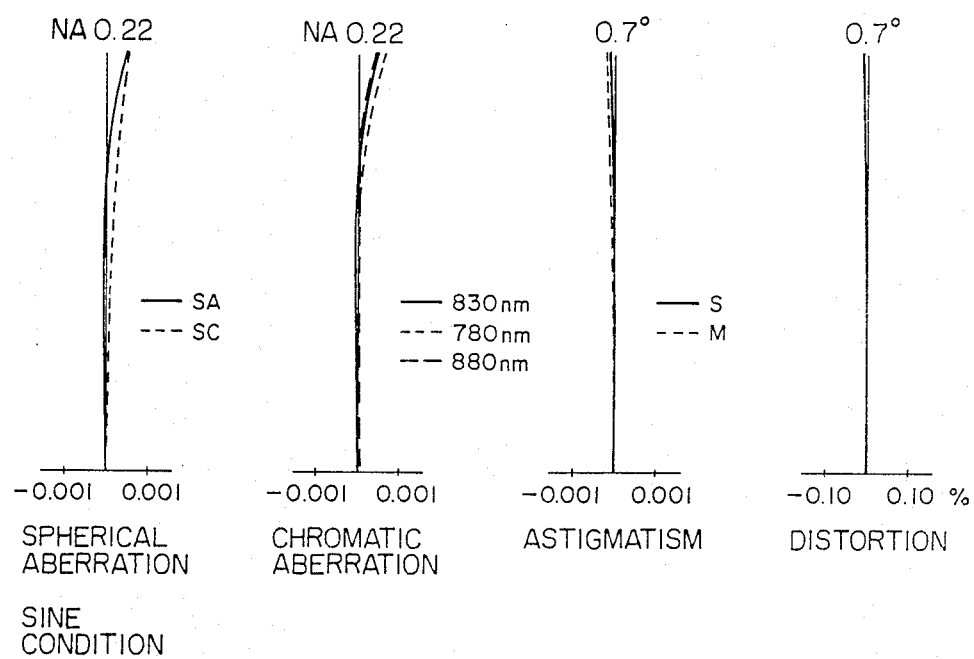
FIG. 2 is a graph plotting the aberrational curves obtained with the lens system of Example 1.
Figure 3:
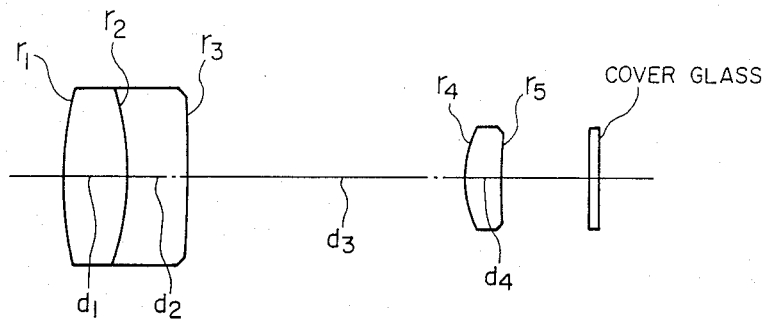
FIG. 3 is a simplified cross-sectional view of the lens system constructed in Example 2.
Figure 4:
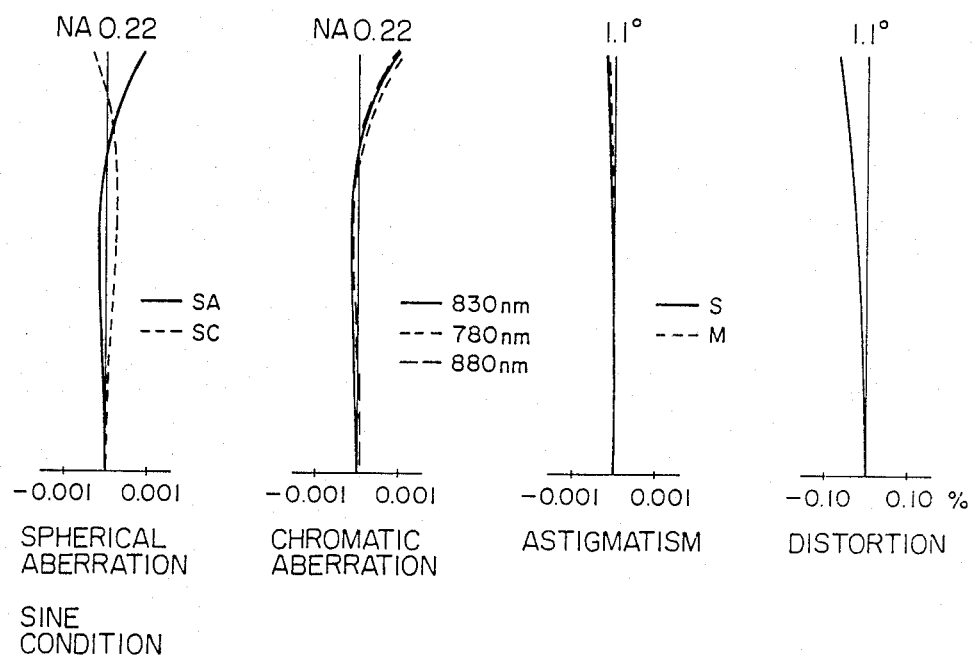
FIG. 4 is a graph plotting the aberrational curves obtained with the lens system of Example 2.
Figure 5:
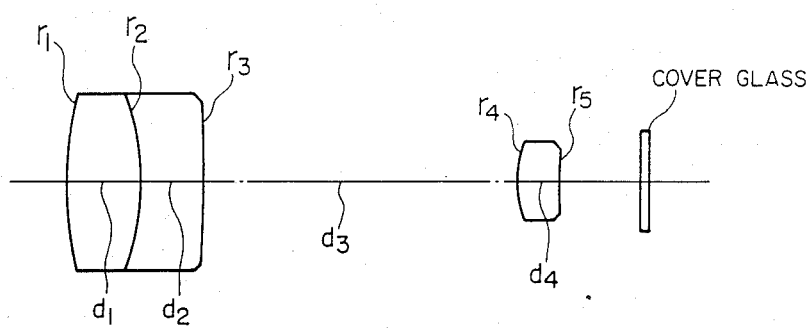
FIG. 5 is a simplified cross-sectional view of the lens system constructed in Example 3.
Figure 6:
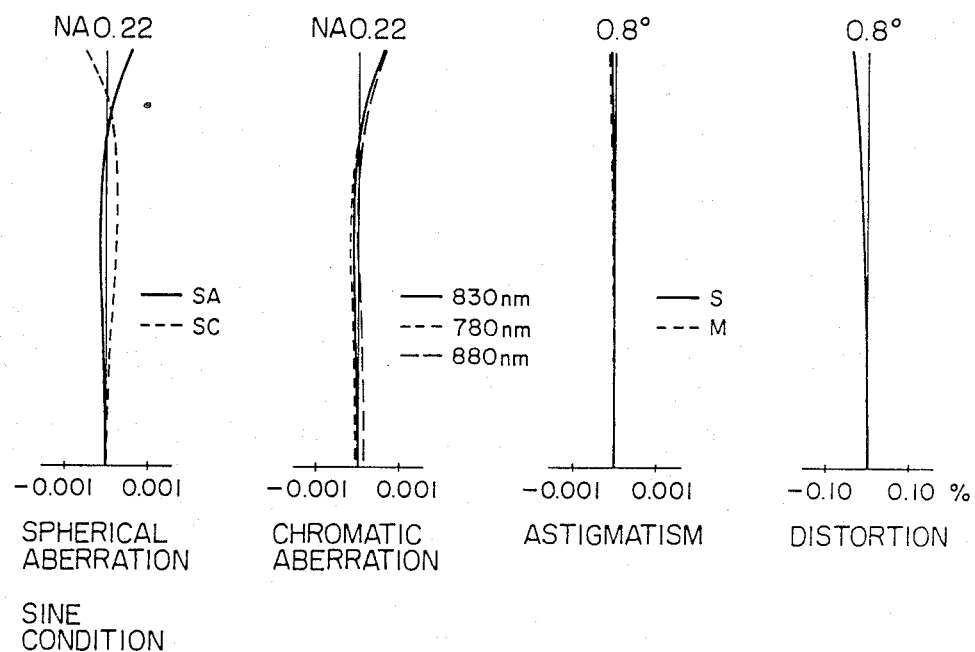
FIG. 6 is a graph plotting the aberrational curves obtained with the lens system of Example 3.
Figure 7:
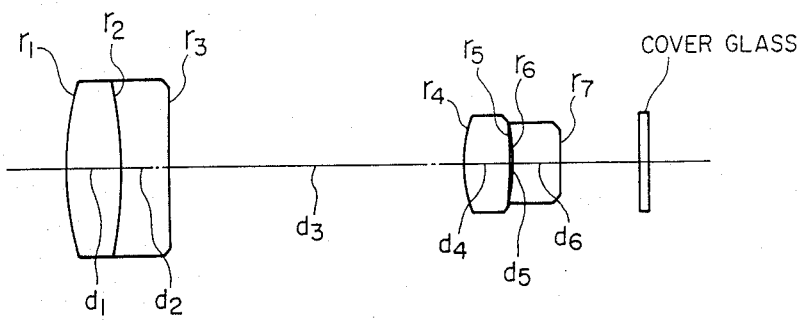
FIG. 7 is a simplified cross-sectional view of the lens system constructed in Example 4.
Figure 8:
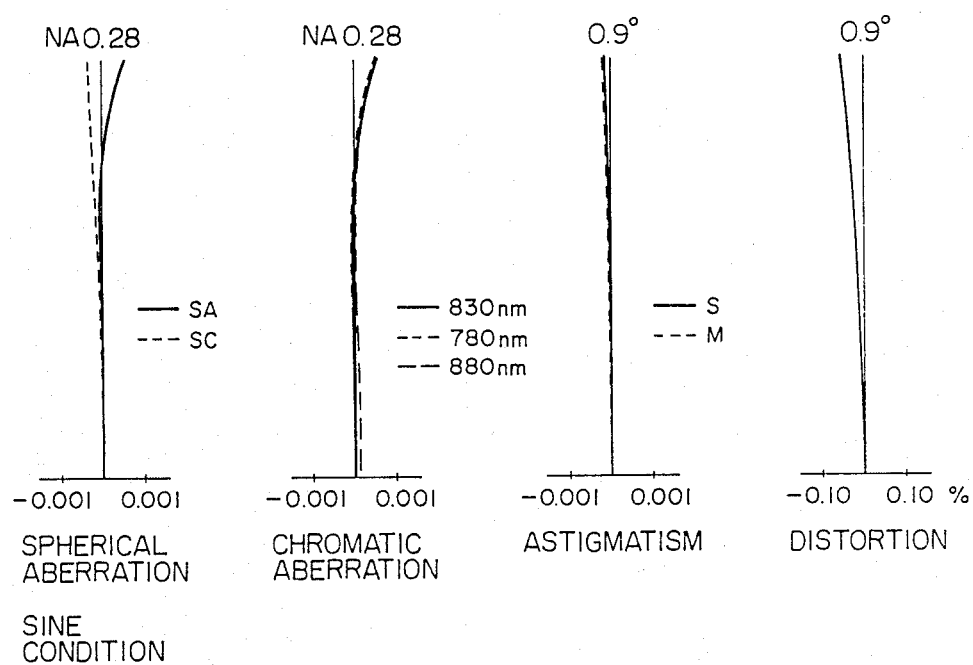
FIG. 8 is a graph plotting the aberrational curves obtained with the lens system of Example 4.
Figure 9:
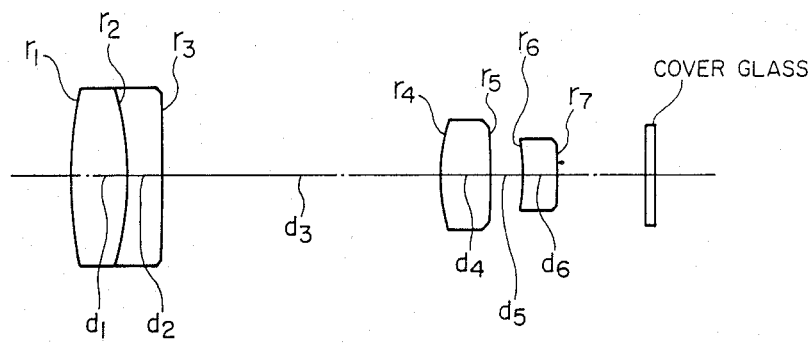
FIG. 9 is a simplified cross-sectional view of the lens system constructed in Example 5.
Figure 10:
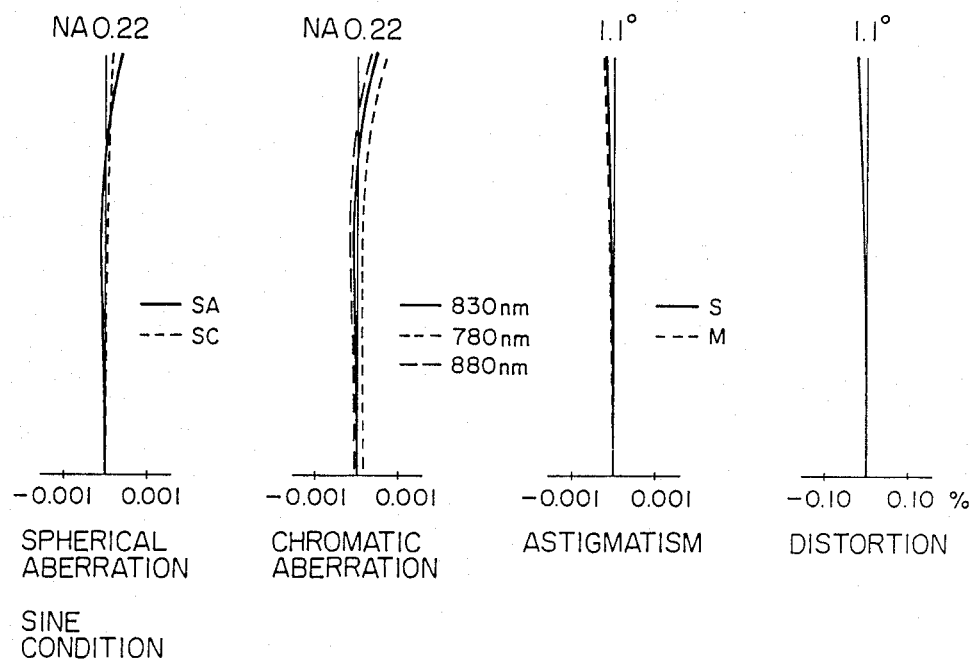
FIG. 10 is a graph plotting the aberrational curves obtained with the lens system of Example 5.
Figure 11:
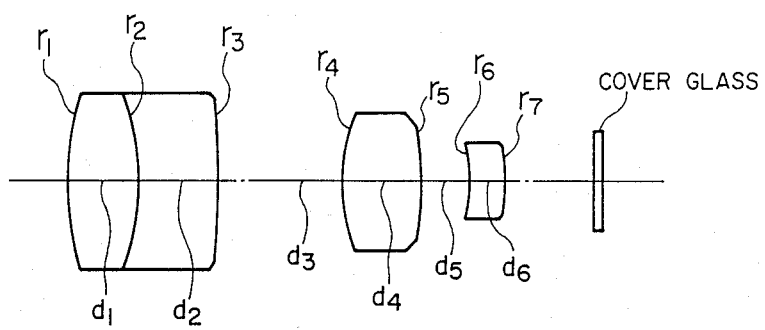
FIG. 11 is a simplified cross-sectional view of the lens system constructed in Example 6.
Figure 12:
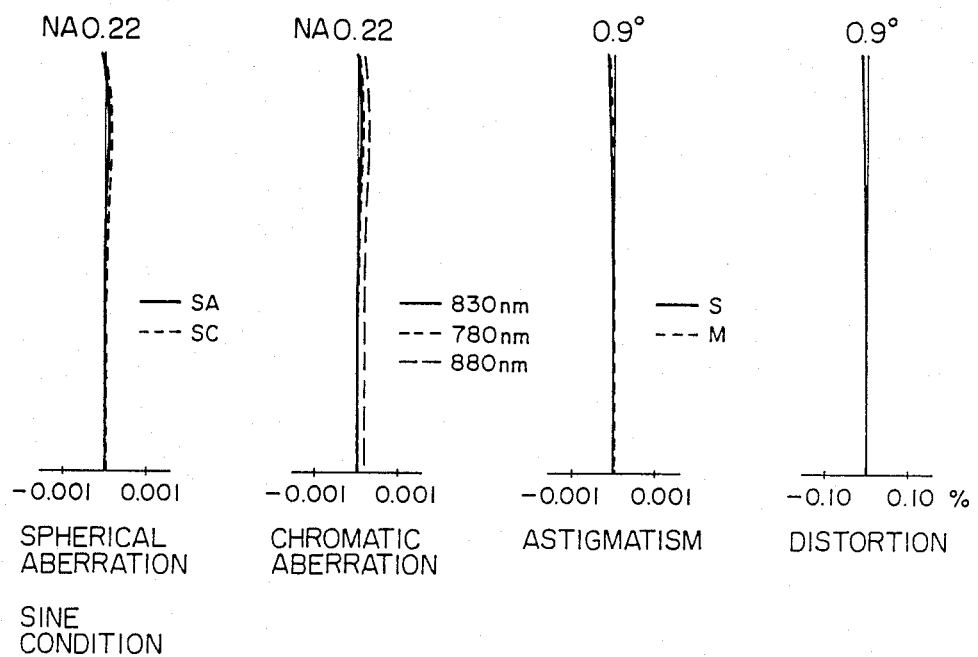
FIG. 12 is a graph plotting the aberrational curves obtained with the lens system of Example 6.
Figure 13:
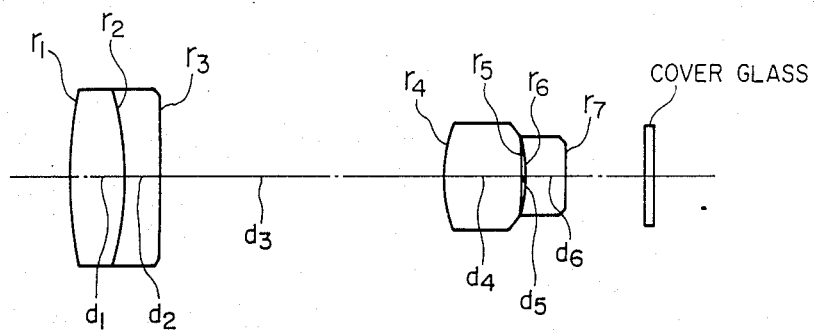
FIG. 13 is a simplified cross-sectional view of the lens system constructed in Example 7.
Figure 14:
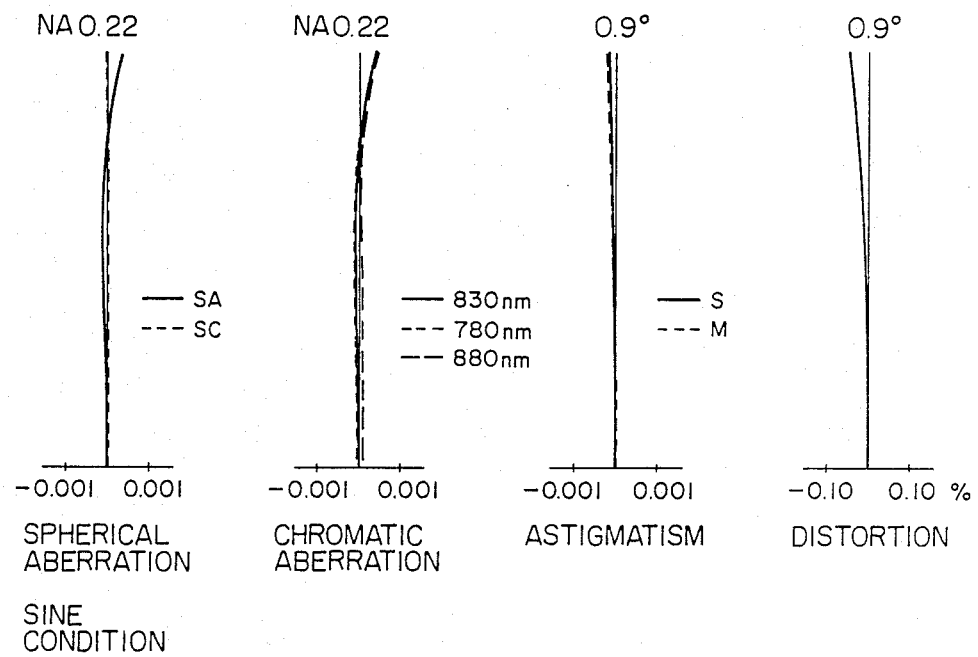
FIG. 14 is a graph plotting the aberrational curves obtained with the lens system of Example 7.
Figure 15:
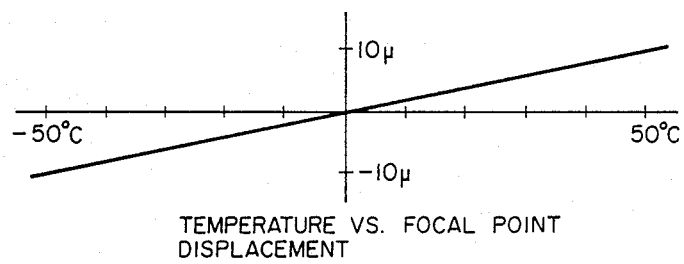
FIG. 15 is a graph depicting the temperature vs. focal point profile of the lens system of Example 1 (similar plots were obtained with the lens systems of Examples 2 and 3)
Figure 16:
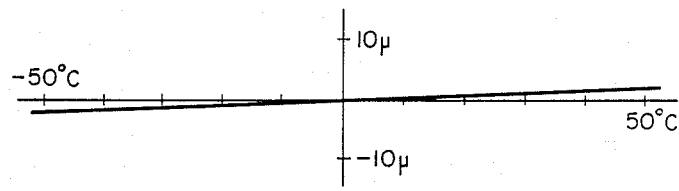
FIG. 16 is a graph depicting the temperature vs. focal point profile of the lens system of Example 4 (similar plots were obtained with the lens systems of Examples 5 to 7).

Each of the aberrational curves shown in FIGS. 2, 4, 6, 8, 10, 12 and 14 was obtained from a system including a cover glass.

DESCRIPTION OF THE PREFERRED EMBODIMENTS

The technical rationale for each of the conditions (1) and (2) is described hereinafter.

The condition (1) relates to the correction of the variations in the focal point and aberrations that may result from fluctuations in the wavelength. Most of the conventional lenses for use with optical disks are not required to take into account variations in the wavelength of the light source used and it suffices that the aberrations that occur at a single wavelength are corrected. In this case, the correction of a spherical aberration and the provision of a predetermined working distance are two important design elements, and the selection of an appropriate optical glass material depends solely upon its refractive index.

However, in the present invention which aims at providing a high-precision lens that will not experience any substantial variation in the focal point or aberrations even if the slightest change occurs in wavelength, it is necessary to satisfy the condition (1). If $\nu_+$ is smaller than its lower limit, it becomes possible to use an optical glass material having a higher refractive index, which is advantageous for the purpose of correcting the spherical aberration, but then difficulty is encountered with correcting the chromatic aberration. If, on the other hand, $\nu_-$ is larger than its upper limit, it becomes possible to use an optical glass material having a lower refractive index, which is advantageous for the purpose of providing a longer working distance, but then difficulty is encountered with correcting the chromatic aberration.

The condition (2) relates to the correction of the variations in the focal point and aberrations that may result from temperature changes. The optical glass material employed in a typical convergent lens system has a positive linear expansion coefficient and therefore, as the temperature increases, the radius of curvature of each of the lens elements is changed such that the backfocus of the overall system is increased, while the thickness of each lens will change such that the backfocus is reduced. Consequently, the variation in the backfocus could be reduced to nearly zero by designing the system in such a manner that the variation in the radius of curvature will cancel the variation in the lens thickness. In fact, however, the lens barrel which is another element in the lens system will experience a substantial change with the increasing temperature, thereby causing a reduction in the backfocus of the system.

In consideration of this phenomenon, the lens system of the present invention is so designed that as the temperature increases, the refractive indices of the lenses will change in such a manner that an increased variation will be introduced into the backfocus of the system, thereby minimizing the change in the focal point of the overall system that may result from temperature changes.

In general, the backfocus of a lens system is decreased if the refractive index of a positive lens is increased, and the backfocus is increased if the refractive index of a negative lens is increased. It is, therefore, desirable to make the positive lens of an optical glass material having a small temperature coefficient of refractive index, and to make the negative lens of an optical glass material having a large temperature coefficient of refractive index. If the value of $\Delta N_-$ is negative and smaller than its lower limit, the backfocus of the overall system is decreased as the temperature rises, thereby making it impossible to minimize the variation in the focal point resulting from the temperature change. If $\Delta N_+/\Delta N_-$ is larger than its upper limit, the backfocus of the overall system is also decreased as the temperature rises, again making it impossible to minimize the variation in the focal point resulting from the temperature change.

EXAMPLES

Seven specific examples of the lens system of the present invention are hereunder described, together with the values of the respective parameters for the focal length f of unity. In Examples 1 to 7, $r_i$ is the radius of curvature of the surface at the i-th position as counted from the surface closest to the light source; $d_i$ is the thickness of the lens at the i-th position as counted from the lens closest to the light source or the aerial distance between the i-th and (i+1)th lenses; $N_i$ is the refractive index of the i-th lens as counted from the lens closest to the light source; $v_i$ is the Abbe number of the i-th lens as counted from the lens closest to the light source; and $\Delta N_i$ is the temperature coefficient unit: $10^{-6}/°$ C. of refractive index of the i-th lens as counted from the lens closest to the light source.

| Surface No. | $r_i$ | $d_i$ | $N_i$ | $v_i$ | $\Delta N_i$ |
|---|---|---|---|---|---|
| Example 1 | | | | | |
| 1 | 1.2763 | 0.1304 | 1.67790 | 55.3 | 0.8 |
| 2 | −0.7173 | 0.0815 | 1.78472 | 25.7 | 9.4 |
| 3 | ∞ | 0.4638 | | | |
| 4 | 0.6735 | 0.0815 | 1.61800 | 63.4 | −3.5 |
| 5 | 5.1964 | | | | |
| Example 2 | | | | | |
| 1 | 1.1117 | 0.2121 | 1.61800 | 63.4 | −3.5 |
| 2 | −0.9001 | 0.2026 | 1.80518 | 25.4 | 10.1 |
| 3 | −4.5069 | 0.9328 | | | |
| 4 | 0.4082 | 0.1158 | 1.61800 | 63.4 | −3.5 |
| 5 | 1.6515 | | | | |
| Example 3 | | | | | |
| 1 | 1.3076 | 0.2405 | 1.61800 | 63.4 | −3.5 |
| 2 | −0.8732 | 0.2105 | 1.76182 | 26.6 | 8.3 |
| 3 | −4.4001 | 1.0489 | | | |
| 4 | 0.3419 | 0.1372 | 1.57099 | 50.8 | 0.0 |
| 5 | 1.3792 | | | | |
| Example 4 | | | | | |
| 1 | 1.0571 | 0.1852 | 1.60311 | 60.7 | 2.7 |
| 2 | −1.2986 | 0.1684 | 1.78472 | 25.7 | 9.4 |
| 3 | 23.5690 | 0.9891 | | | |
| 4 | 0.4190 | 0.1536 | 1.61800 | 63.4 | −3.5 |
| 5 | −21.7503 | 0.0084 | | | |
| 6 | −1.6475 | 0.1578 | 1.78472 | 25.7 | 9.4 |
| 7 | −5.560 | | | | |
| Example 5 | | | | | |
| 1 | 1.3933 | 0.1873 | 1.61800 | 63.4 | −3.5 |
| 2 | −0.9801 | 0.1158 | 1.80518 | 25.4 | 10.1 |
| 3 | −8.9403 | 0.9289 | | | |
| 4 | 0.5263 | 0.1683 | 1.61800 | 63.4 | −3.5 |
| 5 | −2.2460 | 0.1053 | | | |
| 6 | −0.7985 | 0.1158 | 1.80518 | 25.4 | 10.1 |
| 7 | −1.4138 | | | | |
| Example 6 | | | | | |
| 1 | 0.9745 | 0.2391 | 1.48749 | 70.2 | −0.9 |
| 2 | −0.7939 | 0.2632 | 1.80518 | 25.4 | 10.1 |
| 3 | −2.8116 | 0.4103 | | | |
| 4 | 0.5906 | 0.2632 | 1.48749 | 70.2 | −0.9 |
| 5 | −1.0826 | 0.1622 | | | |
| 6 | −0.4663 | 0.1158 | 1.805181 | 25.4 | 10.1 |
| 7 | −0.6962 | | | | |
| Example 7 | | | | | |
| 1 | 1.3465 | 0.1826 | 1.61800 | 63.4 | −3.5 |
| 2 | −1.0557 | 0.1189 | 1.76182 | 26.6 | 8.3 |
| 3 | −9.6129 | 0.9436 | | | |
| 4 | 0.4711 | 0.2632 | 1.57099 | 50.8 | 0.0 |
| 5 | −2.5348 | 0.0084 | | | |
| 6 | −1.3349 | 0.1368 | 1.805181 | 25.4 | 10.1 |
| 7 | −3.0344 | | | | |

As described above, the present invention provides a lens for an optical disk that comprises a front group composed of a cemented lens and a rear group composed of one or two lens elements and which experiences a minimum degree of variations in the focal length and aberrations resulting from changes in the wavelength and temperature.

I claim:

1. A lens system for use with an optical disk comprising, in order from the side of a light source, a front unit composed of a cemented lens made up of positive and negative lenses, and a rear unit composed of at least a single positive lens, said lens system satisfying the following conditions:

$$v_+ > 50, \quad v_- < 35; \quad (1)$$

and $$\Delta N_+/\Delta N_- < 0.5, \quad \Delta N_- > 0 \quad (2)$$

where $v_+$ is the Abbe number of a positive lens, $v_-$ is the Abbe number of a negative lens, $\Delta N_+$ is the temperature coefficient of the refractive index of a positive lens, and $\Delta N_-$ is the temperature coefficient of the refractive index of a negative lens.

2. The lens system according to claim 1, further satisfying the following chart:

| Surface No. | $r_i$ | $d_i$ | $N_i$ | $\nu_i$ | $\Delta N_i$ |
| --- | --- | --- | --- | --- | --- |
| 1 | 1.2763 | 0.1304 | 1.67790 | 55.3 | 0.8 |
| 2 | −0.7173 | 0.0815 | 1.78472 | 25.7 | 9.4 |
| 3 | ∞ | 0.4638 | | | |
| 4 | 0.6735 | 0.0815 | 1.61800 | 63.4 | −3.5 |
| 5 | 5.1964 | | | | | wherein $r_i$ = the radius of curvature of the surface at the i-th position as counted from the surface closest to the light source;

$d_i$ = the thickness of the lens at the i-th position as counted from the lens closest to the light source or the aerial distance between the i-th and (i+1)th lenses;

$N_i$ = the refractive index of the i-th lens as counted from the lens closest to the light source;

$V_i$ = the Abbe number of the i-th lens as counted from the lens closest to the light source; and $\Delta N_i$ = the temperature coefficient unit: $10^{-6}/°C$. of refractive index of the i-th lens as counted from the lens closest to the light source.

3. The lens system according to claim 1, further satisfying the following chart:

| Surface No. | $r_i$ | $d_i$ | $N_i$ | $\nu_i$ | $\Delta N_i$ |
| --- | --- | --- | --- | --- | --- |
| 1 | 1.1117 | 0.2121 | 1.61800 | 63.4 | −3.5 |
| 2 | −0.9001 | 0.2026 | 1.80518 | 25.4 | 10.1 |
| 3 | −4.5069 | 0.9328 | | | |
| 4 | 0.4082 | 0.1158 | 1.61800 | 63.4 | −3.5 |
| 5 | 1.6515 | | | | | wherein $r_i$ = the radius of curvature of the surface at the i-th position as counted from the surface closest to the light source;

$d_i$ = the thickness of the lens at the i-th position as counted from the lens closest to the light source or the aerial distance between the i-th and (i+1)th lenses;

$N_i$ = the refractive index of the i-th lens as counted from the lens closest to the light source;

$V_i$ = the Abbe number of the i-th lens as counted from the lens closest to the light source; and $\Delta N_i$ = the temperature coefficient unit: $10^{-6}/°C$. of refractive index of the i-th lens as counted from the lens closest to the light source.

4. The lens system according to claim 1, further satisfying the following chart:

| Surface No. | $r_i$ | $d_i$ | $N_i$ | $\nu_i$ | $\Delta N_i$ |
| --- | --- | --- | --- | --- | --- |
| 1 | 1.3076 | 0.2405 | 1.61800 | 63.4 | −3.5 |
| 2 | −0.8732 | 0.2105 | 1.76182 | 26.6 | 8.3 |
| 3 | −4.4001 | 1.0489 | | | |
| 4 | 0.3419 | 0.1372 | 1.57099 | 50.8 | 0.0 |
| 5 | 1.3792 | | | | | wherein $r_i$ = the radius of curvature of the surface at the i-th position as counted from the surface closest to the light source;

$d_i$ = the thickness of the lens at the i-th position as counted from the lens closest to the light source or the aerial distance between the i-th and (i+1)th lenses;

$N_i$ = the refractive index of the i-th lens as counted from the lens closest to the light source;

$V_i$ = the Abbe number of the i-th lens as counted from the lens closest to the light source; and $\Delta N_i$ = the temperature coefficient unit: $10^{-6}/°C$. of refractive index of the i-th lens as counted from the lens closest to the light source.

5. The lens system according to claim 1, further satisfying the following chart:

| Surface No. | $r_i$ | $d_i$ | $N_i$ | $\nu_i$ | $\Delta N_i$ |
| --- | --- | --- | --- | --- | --- |
| 1 | 1.0571 | 0.1852 | 1.60311 | 60.7 | 2.7 |
| 2 | −1.2986 | 0.1684 | 1.78472 | 25.7 | 9.4 |
| 3 | 23.5690 | 0.9891 | | | |
| 4 | 0.4190 | 0.1536 | 1.61800 | 63.4 | −3.5 |
| 5 | −21.7503 | 0.0084 | | | |
| 6 | −1.6475 | 0.1578 | 1.78472 | 25.7 | 9.4 |
| 7 | −5.560 | | | | | wherein $r_i$ = the radius of curvature of the surface at the i-th position as counted from the surface closest to the light source;

$d_i$ = the thickness of the lens at the i-th position as counted from the lens closest to the light source or the aerial distance between the i-th and (i+1)th lenses;

$N_i$ = the refractive index of the i-th lens as counted from the lens closest to the light source;

$V_i$ = the Abbe number of the i-th lens as counted from the lens closest to the light source; and $\Delta N_i$ = the temperature coefficient unit: $10^{-6}/°C$. of refractive index of the i-th lens as counted from the lens closest to the light source.

6. The lens system according to claim 1, further satisfying the following chart:

| Surface No. | $r_i$ | $d_i$ | $N_i$ | $\nu_i$ | $\Delta N_i$ |
| --- | --- | --- | --- | --- | --- |
| 1 | 1.3933 | 0.1873 | 1.61800 | 63.4 | −3.5 |
| 2 | −0.9801 | 0.1158 | 1.80518 | 25.4 | 10.1 |
| 3 | −8.9403 | 0.9289 | | | |
| 4 | 0.5263 | 0.1683 | 1.61800 | 63.4 | −3.5 |
| 5 | −2.2460 | 0.1053 | | | |
| 6 | −0.7985 | 0.1158 | 1.80518 | 25.4 | 10.1 |
| 7 | −1.4138 | | | | | wherein $r_i$ = the radius of curvature of the surface at the i-th position as counted from the surface closest to the light source;

$d_i$ = the thickness of the lens at the i-th position as counted from the lens closest to the light source or the aerial distance between the i-th and (i+1)th lenses;

$N_i$ = the refractive index of the i-th lens as counted from the lens closest to the light source;

$V_i$ = the Abbe number of the i-th lens as counted from the lens closest to the light source; and $\Delta N_i$ = the temperature coefficient unit: $10^{-6}/°C$. of refractive index of the i-th lens as counted from the lens closest to the light source.

7. The lens system according to claim 1, further satisfying the following chart:

| Surface No. | $r_i$ | $d_i$ | $N_i$ | $\nu_i$ | $\Delta N_i$ |
|---|---|---|---|---|---|
| 1 | 0.9745 | 0.2391 | 1.48749 | 70.2 | −0.9 |
| 2 | −0.7939 | 0.2632 | 1.80518 | 25.4 | 10.1 |
| 3 | −2.8116 | 0.4103 | | | |
| 4 | 0.5906 | 0.2632 | 1.48749 | 70.2 | −0.9 |
| 5 | −1.0826 | 0.1622 | | | |
| 6 | −0.4663 | 0.1158 | 1.805181 | 25.4 | 10.1 |
| 7 | −0.6962 | | | | | wherein $r_i$ = the radius of curvature of the surface at the i-th position as counted from the surface closest to the light source;

$d_i$ = the thickness of the lens at the i-th position as counted from the lens closest to the light source or the aerial distance between the i-th and (i+1)th lenses;

$N_i$ = the refractive index of the i-th lens as counted from the lens closest to the light source;

$V_i$ = the Abbe number of the i-th lens as counted from the lens closest to the light source; and $\Delta N_i$ = the temperature coefficient unit: $10^{-6}/°C$. of refractive index of the i-th lens as counted from the lens closest to the light source.

8. The lens system according to claim 1, further satisfying the following chart:

| Surface No. | $r_i$ | $d_i$ | $N_i$ | $\nu_i$ | $\Delta N_i$ |
|---|---|---|---|---|---|
| 1 | 1.3465 | 0.1826 | 1.61800 | 63.4 | −3.5 |
| 2 | −1.0557 | 0.1189 | 1.76182 | 26.6 | 8.3 |
| 3 | −9.6129 | 0.9436 | | | |
| 4 | 0.4711 | 0.2632 | 1.57099 | 50.8 | 0.0 |
| 5 | −2.5348 | 0.0084 | | | |
| 6 | −1.3349 | 0.1368 | 1.805181 | 25.4 | 10.1 |
| 7 | −3.0344 | | | | | wherein $r_i$ = the radius of curvature of the surface at the i-th position as counted from the surface closest to the light source;

$d_i$ = the thickness of the lens at the i-th position as counted from the lens closest to the light source or the aerial distance between the i-th and (i+1)th lenses;

$N_i$ = the refractive index of the i-th lens as counted from the lens closest to the light source;

$V_i$ = the Abbe number of the i-th lens as counted from the lens closest to the light source; and $\Delta N_i$ = the temperature coefficient unit: $10^{-6}/°C$. of refractive index of the i-th lens as counted from the lens closest to the light source.

9. The lens system according to claim 1, wherein said rear unit is composed of a positive lens and a negative lens.

* * * * *